US008430046B1

(12) United States Patent
Shkolnikov

(10) Patent No.: US 8,430,046 B1
(45) Date of Patent: Apr. 30, 2013

(54) MATERIAL-TRANSITION STRUCTURAL COMPONENT FOR PRODUCING OF HYBRID SHIP HULLS, SHIP HULLS CONTAINING THE SAME, AND METHOD OF MANUFACTURING THE SAME

(75) Inventor: Vladimir M. Shkolnikov, Bellerose, NY (US)

(73) Assignee: Beltran, Inc., Brooklyn, NY (US)

( * ) Notice: Subject to any disclaimer, the term of this patent is extended or adjusted under 35 U.S.C. 154(b) by 0 days.

(21) Appl. No.: 13/374,306

(22) Filed: Dec. 21, 2011

(51) Int. Cl.
*B63B 3/00* (2006.01)
*B63B 5/24* (2006.01)

(52) U.S. Cl.
USPC .......................................... 114/65 R; 114/357

(58) Field of Classification Search .................. 114/65 R, 114/357
See application file for complete search history.

(56) References Cited

U.S. PATENT DOCUMENTS

| | | | | |
|---|---|---|---|---|
| 4,662,587 | A * | 5/1987 | Whitener | 244/117 R |
| 5,551,204 | A * | 9/1996 | Mayrand | 52/795.1 |
| 5,778,813 | A * | 7/1998 | Kennedy | 114/74 A |
| 6,114,050 | A * | 9/2000 | Westre et al. | 428/608 |
| 6,386,131 | B1 | 5/2002 | Barsoum | |
| 6,505,571 | B1 * | 1/2003 | Critchfield et al. | 114/65 R |
| 6,941,888 | B2 | 9/2005 | Barsoum | |
| 8,020,504 | B2 | 9/2011 | Shkolnikov | |
| 2008/0163810 | A1 * | 7/2008 | Mataya et al. | 114/357 |

OTHER PUBLICATIONS

Barsoum RPS. The Best of Both Words. Hybrid Ship Hulls use Composites & Steel. AMPTIAC Quarterly v. 7, No. 3, 2003, pp. 55-61.
Anderson E.A., Henry, R., Shkolnikov, V.M., Non-Linear FEA of Combined Joint of Metal and Non-Metal Structure Components, *Proceedings of ABAQUS User's Conference*, Newport, RI, May 29-31, 2002, pp. 1-14.
Messler, R.W., Jr., Joining Composite Materials and Structures: Some Thought-Provoking Possibilities, *Journal of Thermoplastic Composite Materials*, vol. 17, No. 1, 2004, pp. 51-75.
Weitzenböck, J.R. and McGeorge, D., Bondship project guidelines, ISBN 82-515-0305-1, 2005, Det Norske Veritas, 254 p.
Shkolnikov, V.M., Dance, B.G.I. et al. Advanced Hybrid Joining Technology, *Proceedings of the ASME 28th International Conference on Ocean, Offshore and Artic Engineering*, OMAE2009, Honolulu, Hawaii, May 31-Jun. 5, 2009, 10 p.
Dance, B. G. I., Kellar, E. J. C., 2004, Workpiece Structure Modification, *International Patent Publication WO 2004/028731 A1*.
Comeld™—Composite to Metal Joining. TWI Presentation, Jan. 2005, http://www.twi.co.uk/j32k/unprotected/pds/comeldJan05.pdf.
Khodorkovsky, Y., Mouring, S., Shkolnikov, V.M., Advanced Hybrid Joining Technology, *Proceedings of the 1st International Conference on Lightweight Design for Marine Structure*, Glasgow, UK, Sep. 7-8, 2009, 10p.

* cited by examiner

*Primary Examiner* — Stephen Avila

(57) ABSTRACT

A material-transition structural component for a ship hull, comprising a metal element and a fiber-reinforced polymer-matrix composite element, which are adhesively bonded, wherein the composite element is being produced during composite material processing simultaneously providing a metal-composite consolidation, for producing hulls for ships, a ship hull containing the same, as well as to a method of manufacturing of the material and the ship hull.

10 Claims, 3 Drawing Sheets

MATERIAL-TRANSITION STRUCTURAL COMPONENT FOR PRODUCING OF HYBRID SHIP HULLS, SHIP HULLS CONTAINING THE SAME, AND METHOD OF MANUFACTURING THE SAME

BACKGROUND OF THE INVENTION

The present invention relates to implementation of a hybrid (metal-composite) ship hull concept and a material-transition structural component, including a hybrid joint, that is to connect material-dissimilar hybrid hull structures for producing hulls for ships, to a ship hull containing the same, as well as to a method of manufacturing of the material-transition structural component and the ship hull.

It is known to use for construction of ship hulls a combination of two classes of structural materials, metals, which are commonly quite strong but heavy and prone to corrosion, and fiber-reinforced polymer-matrix composites, which are generally light-weight and corrosion resistant. These hybrid hulls may embody either a primary metal hull with incorporated composite structural components, such as bulkheads, platforms and topside structures among others, or, opposite, a primary composite hull/structure outfitted with metal hardware, such as deck mooring bits, chocks and cleats among many others.

A series of recent patents and scientific-technical papers [1-5] enlighten the hybrid hull idea with regard to major hull structures of a primarily metal ship, bow and stern sections as well as midship side panels. These conceivable applications are associated with assorted potential functional, structural, and operational benefits.

Particularly, the anticipated benefits include weight saving, corrosion prevention, increased inclination stability, lowered life-cycle cost, augmented deadweight/displacement ratio, and improved propulsion characteristics, all of which are critical to boost a vessel's speed and/or non-refueled range. Along with those, composite/hybrid structures are preferred to improve signature control of a naval vessel.

It has been however recognized that benefits of the hybrid hull implementation is in large depending upon structural efficiency of composite-to-metal transition structure or a hybrid joint that is typically notably lower than that of neighboring mono-material structural components, either metal or composite. The lowered performance of a material transition structure is due to several traits inherent to a fiber-reinforced composite being interrupted within a material-transition (or a joint) structure that is well documented to date [6-9]:

Discontinued fiber reinforcements
Relatively low out-of-plane mechanical properties
Stress concentration attributable to both joint's intricate geometry and abrupt change of material stiffness within a joint
Complicated manufacturing procedure relevant to a two-/multi-material structural system
Underperformance of secondary (post-cured) bond, if any
Tightened requirements to metal contact surface preps.

To compensate these adverse impacts, assorted measures are to be implemented. Typically, those comprise enlargement of adhesive bonding area and/or incorporation of mechanical fastening (such as bolting, screwing or riveting). Nevertheless, even a hybrid joint that combines adhesive bonding with fastening that represents the current state-of-the-art in heavy-duty hybrid joining being used over a range of industry sectors while possesses the highest structural efficiency available to date is yet excessively heavy and labor intense due to massive hole-drilling and fastening (e.g., bolt-nuts coupling) operations.

Patents [5, 10] disclose an advanced method of structurally efficient composite-to-metal joining that combines adhesive bonding with transverse pinning of the composite to the metal by tiny projections/features protruded from the metal surface by application of a power beam, e.g., an electron beam or a laser beam.

Such bonded-pinned hybrid joints demonstrate an opportunity to gain great structural efficiency superior to that of common joining options, both plain adhesive bond and bonded-fastened joint [9, 11, 12] while being commensurate in labor and cost with those of a plain adhesive bond. This advanced bonded-pinned joining technology is potentially applicable for a material-transition structure regarding any hybrid hull component that includes but not limited with bow and stern sections, midship side panels, bulkheads, platforms, deckhouse, and foundations for machinery and equipment as well as other heavily-loaded ship structures, such as rudders, impellers and waterjet inlet tunnels among others.

A number of peculiarities inherent to implementation of this novel class of joints are to be taken into consideration and relevant requirements critical for a bonded-pinned joint performance must be satisfied in order to attain the desired high level of structural performance of the joints. Specifically, those are to provide:

Tight contact between composite and metal elements
Complete incorporation of the projection pins of metal element into composite element
Sufficient resistance of the pins to in-plane loading
Proper penetration of polymer resin into fiber material of the composite element as well as into cavities being intruded within the metal element simultaneously with its protrusion.

Most of design-manufacturing parameters, primary contributing to performance of said bonded-pinned joint, are interconnected and mutually influential. Due to that, variation of those parameters may cause a contradictory effect, either increasing or decreasing a joint's structural performance. In particular, principal dimensions of a protrusion pin, such as its base and height responsible for the pin's in-plane resistance, if excessive, impede provision of two other vital traits, proper penetration of the pins into composite and tight contact of adjacent composite and metal elements. Similarly, disproportionate toughness of the composite element interferes with its permissibility to the pins incorporation into the composite.

To abate those contradictions, a proper balance between joint's parameters needs be provided in order of attaining its high structural performance. Along with that, certain modification of conventional composite material processing providing simultaneous metal-composite consolidation is to be implemented.

SUMMARY OF THE INVENTION

It is therefore an object of the present invention to provide a material-transition structural component for producing of hybrid ship hulls, ship hulls containing the same, and method of manufacturing the same, which are further improvements of the existing solutions of this type.

In keeping with these objects and with others which shall become apparent hereinafter, one feature of the present invention resides, briefly stated, in a material-transition structural component for a ship hull which includes a metal element and a fiber-reinforced polymer-matrix composite element which are adhesively bonded as well as conformably engaged with projections and corresponding cavities at contact surfaces of said metal and composite elements to add mechanical resistance to the adhesive bond being produced during simultaneous composite processing and the metal-composite consolidation.

When the material-transition component is formed in accordance with the present invention and used in a ship hull, substantial weight saving of hull structures critically important for high-speed vessels can be achieved along with significant improvement of other key performance parameters of the vessel.

Projections protruded from the metal surface penetrate into the composite, while a tight contact between metal and composite surfaces is provided to boost structural performance of the material-transition component.

Projections from the metal surface are formed as upright pins supported by side brackets/stiffeners to maximize resistance of said projections to in-plane loading while providing easy penetration of those into the composite element and tight metal-to-composite contact, which are to assure proper structural performance of the material-transition component.

The metal element includes lap plate(s) which is (are) perforated with through-holes to control penetration of polymer resin into both fiber material and cavities in the lap plate(s) being intruded at surface of that (those) during preparation of the metal element to the material-transition component assembly.

Metal-to-metal interface of plates, which constitute the metal element, is added with at least a ply of fiber material extended from the adjacent metal-to-composite interface to control penetration of the polymer resin into said metal-to-metal interface and to provide its complete bonding while simultaneously enlarging the composite-to-metal bonding area of the material transition increasing thus structural efficiency of the material-transition component in a whole.

The material-transition structural component can be provided in a small local area of the ship hull or it can constitute a whole hybrid panel/section of the ship hull.

The present invention further deals with a method of manufacturing of the above specified material-transition structural component and of the ship hull which contains such a component.

The novel features which are considered as characteristic for the present invention are set forth in particular in the appended claims. The invention itself, however, both as to its construction and its method, together with additional objects and advantages thereof, will be best understood from the following description of specific embodiments when read in connection with the accompanying drawings.

DESCRIPTION OF THE PREFERRED EMBODIMENTS

Figure 1:
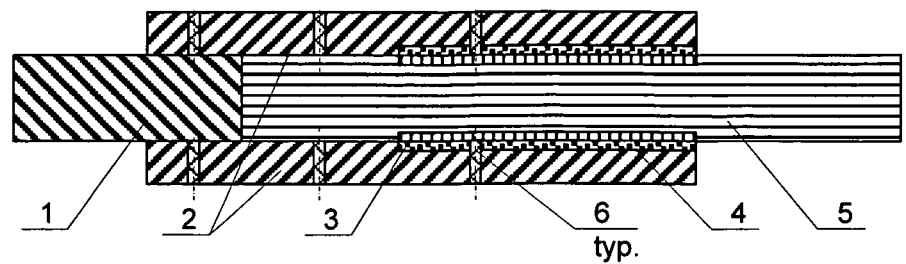
FIG. 1 is a basic cross-section view showing a new material-transition structural component for a ship hull in accordance with the present invention.

FIG. 1 shows a cross-section of a new material-transition structural component for a ship hull in accordance with the present invention.

The material-transition structural component includes a metal element which comprises a metal middle plate (1) that represents a part of a metal base hull structure and metal lap plates (2) each having at least one protruded-intruded surface. Composite element (4) that represents a part of composite hull structure is adhesively bonded and conformably engaged with lap plates (2) at their interfaces. More particularly projections (3) protruded from and cavities (4) intruded in a surface of at least one, preferably both, lap plates (2) are engaged with composite element (5), adding a mechanical resistance to the adhesive bonding of metal plates (2) and composite element (5). Through holes (6) which can be made in lap plates (2) are being filled-up with polymer resin during material processing of the composite element (5) that indicates complete wet-out of the fibrous material of said composite element (5), including its interface with the metal element as well as cavities (4), intruded in metal plates (2) and metal-metal interface of plates (1) and (2) making up the metal element, during processing of the material-transition component.

In the subsequent figures the same components of the inventive material-transition structural component will be identified with the same reference numerals.

Figure 2:
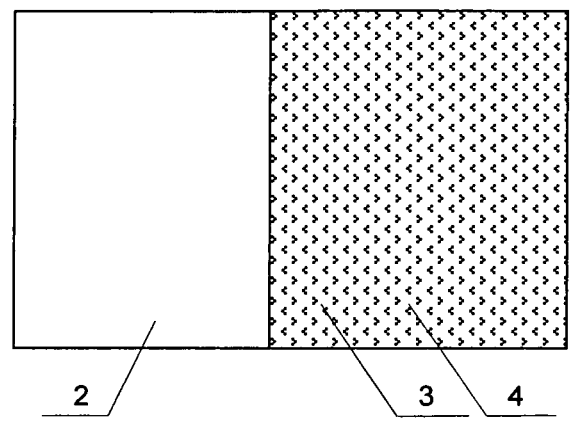
FIG. 2 is a view on a contact surface of a lap plate of the metal element, being protruded with arrays of customized autogenous projections and intruded with corresponding arrays of cavities, that is to be conformably engaged and adhesively bonded with the composite element of material-transition structural component of a ship hull in accordance with the present invention.

FIG. 2 shows a lap plate (2) with a part of its surface being protruded-intruded with arrays of projections (3) and corresponding arrays of cavities (4).

Figure 3:
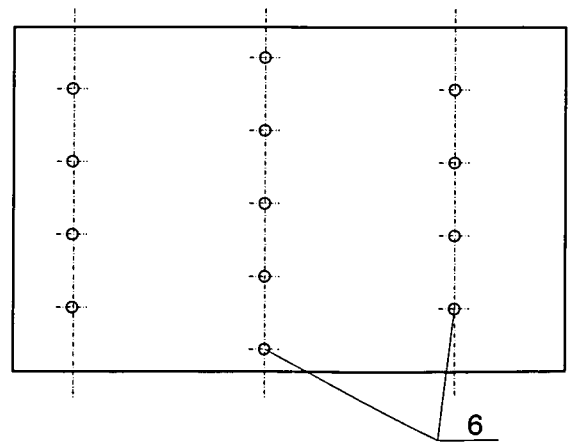
FIG. 3 is a view showing a perforated lap plate of the metal element of material-transition component for a ship hull in accordance with the present invention.

FIG. 3 shows lap plate (2) that can be perforated with through-holes (6), which are spaced from one another for example in mutually perpendicular distance to control penetration of polymer resin into fiber material of composite element (5) and/or cavities (4), intruded in metal plates (2) during processing of the material-transition component, in case a vacuum-assisted resin infusion is being employed for the material processing, assuring its proper manufacturing performance of the material-transition component.

Figure 4:
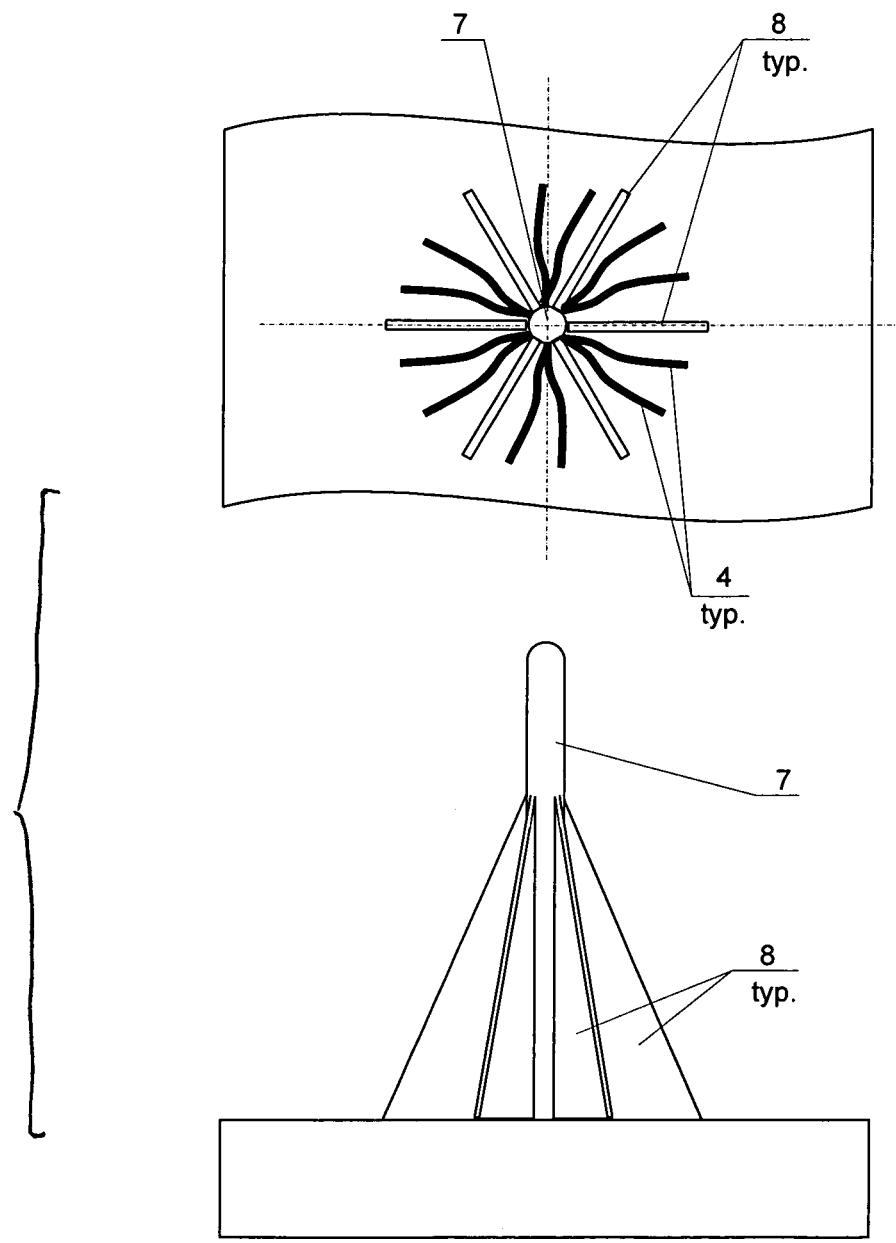
FIG. 4 is a view showing typified schematic configurations of both an individual projection being protruded from and corresponding cavities being intruded in a surface of a lap plate of the metal element of material-transition component for a ship hull in accordance with the present invention.

FIG. 4 schematically shows a typified configuration of an individual projection pin (7) being protruded from surface of lap plate (2) that is supported with a few side brackets (8) distributed around the pin (7) to increase its resistance to in-plane loading while providing both easy penetration of the pin into fibrous material of the composite element (5) and tight metal-to-composite contact, which assure proper structural performance of the material-transition component in a whole.

The elements (7), (8) form the projections (3) while the spaces between them form the cavities (4).

In accordance with the present invention the above-described material-transition structural component can constitute a limited structure of a ship hull such as a hybrid joint. On the other hand, it can be expanded so as to form an entire hybrid structural panel/section of a hybrid hull.

The material-transition structural component in accordance with the present invention can be produced with manufacturing process based on substantially the same material processing techniques applicable for construction of large mono-material hull structures, either full metallic or full composite. Either open- or closed-mold material processing might be utilized accompanied with hand lay-up or robotic material placement while dealing with a material preform or a prepreg. In case of close-mold processing that is associated with known environmental and material performance advantages, vacuum bag molding (using either dry preform or dry or wet prepreg) or vacuum infusion processing are applicable. Any combination of those, as it is common for the composite shipbuilding, is also possible.

Figure 5:
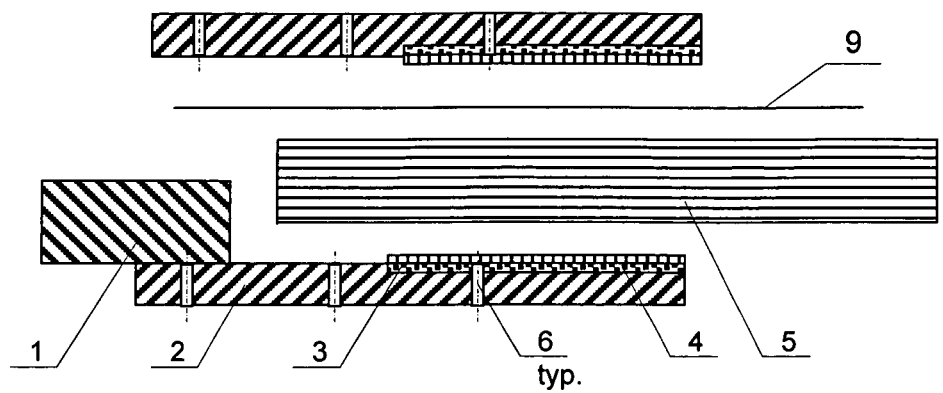
FIG. 5 is a view illustrating a material layup that constitutes a new material-transition structural component and material processing of that material layup that is required to produce a robust and structurally efficient material-transition component and a ship hull with use of the new structural component.

FIG. 5 schematically illustrates a preassembled material layup of a metal double-lap material-transition structural component which along with previously enumerated elements (1-5) contains an extended external layer (9) of fiber material of composite element (5) which at the right side is located between the upper lap plate (2) and the composite element (5) and at the left side is placed at the metal-metal interface of middle plate (1) and the upper lap plate (2) to link that with the composite element (5) and to boost penetration of the polymer resin into the metal-metal interface and to assure proper bonding of the metal plates (1) and (2) making up the metal element of the material-transition structural component.

Upon assembly the material-transition layup shown in FIG. 5 is to be wetted with polymer resin and cured forming a consolidated metal-composite material-transition structural component. Either prior or after the resin infusion, the whole component is to be joined to the base metal hull structure via metal plate (1) applying conventional welding, fastening and/or adhesive bonding technique. When welding is used regarding the material layup being infused with the polymer resin, precaution needs to be applied to prevent overheating of the neighboring polymer matrix composite.

In difference from conventional composite material processing applicable for a full-composite construction, material processing shall combine three simultaneously-executed procedures, formation of the composite element (5), consolidation of that with plates (1, 2) of the metal element and adhesive bonding of those. Acting this way it will be possible to minimize fit up problems between the large metal and composite elements being assembled into a hybrid structure and eliminate secondary bonding within material transition, reducing labor operations and preventing the material transition structure from lowering its performance providing also high repeatability and predictability of the material quality within the structural component being manufactured.

Altogether these performance traits are to ensure integrity, robustness and serviceability, and reliability of the material-transition structural component required for a hybrid hull.

Specifically, the following principle processing steps should be performed regarding the metal double-lap material-transition structural component corresponding to FIG. 5:

1) Form a stack of fiber material plies of the composite element (5) comprising either dry preform or dry or wet prepreg which may include continuous filament mat, woven fabric, and/or unidirectional fibers at alternated orientation.

2) Protrude surface of metal plates (2) and place one of those with protruded surface up into a mold for assembly and processing of the material-transition component; plate (2) might be placed into the mold together with plate (1) being already joined applying conventional metal joining technique, such as welding or fastening.

3) Lay down the extended layer (9) of filament material over the metal plate (2) as well as plate (1) as that is being preassembled with plate (2).

4) Debulk the extended layer (9) of fiber material against to the protruded metal surface of plate (2), applying pressure, tapping and/or vacuum and providing a firm contact between the fiber material and the metal base surface beyond the pins forming the first sub-assembly of metal lap plate (2) and fiber layer (9) of composite element (5).

5) Repeat step #4 for the following plies of the fiber material of composite element (5) until that completely covers the protruded projections (3)

6) Repeat steps ##3-5 outside the mold forming the second sub-assembly of fibrous layers of composite element (5) and second metal lap plate (2), if that is used.

7) Place remaining internal plies of the prepared stack the fibrous material of composite element (5) over the first metal-fiber layers sub-assembly.

8) Place the second metal-fibers sub-assembly over the internal fiber plies of composite element (5), if that is used.

9) Squeeze the formed material layup using mechanical clamping and/or vacuuming.

10) Joint the metal lap plate(s) (2) and middle plate (1) applying a conventional metal joining technique such as fastening, welding, adhesive bonding or a combination of those; if welding process is chosen, use caution and/or temperature control to prevent/minimize melting of the fiber material and/or ignition of the resin within wet or prepreg fiber laminate as that is present.

11) Release the clamps/vacuum.

12) Infuse polymer resin, if dealing with a dry fiber preform otherwise proceed to step #13.

13) Cure the resin.

Assorted material/design/technology options of a material-transition structural component are capable to satisfy the requirements to structural efficiency, corrosion resistance and moderation of the manufacturing cost. Basic options include a material layup with either metal or composite double-lap that could be employed suitably for a particular structural application; metal surface facing polymer-matrix composite being adhesively bonded with that is protruded with projections, like those described in references [5, 9-12], which penetrate into and pin the composite to the metal transversely reinforcing that and adding a mechanical locking to the adhesive bonding between the metal and composite.

A wide assortment of metal grades is relevant to manufacturing of the material-transition structural component of a hybrid ship hull. These include, but are not limited to marine grade steel alloys, such EH-36/DH-36 (ASTM A945 Grade 65) and their naval analogues, such as HLSA-65 steel alloy, marine grade stainless steel alloy, such as AL-6XN, stainless steel cast Ca6 nm, super duplex alloy (e.g. Sandvik 2205), nickel aluminum bronze C95800, and titanium structural alloys, among possible others.

Fiber-reinforced (glass, carbon and aramid) polymer matrix composites based on a polymer resin, such as toughened vinyl ester (VE), epoxy, polyester, polyurethane, and/or phenolic, exemplify candidate materials for composite element of the material transition structural component. Unidirectional fiber material alternated in-plane orientation, 2D and/or 3D woven fabric and/or (veil) mat represent an assortment of acceptable common fiber material options.

Depending on application, the structural component might be produced either for a limited material transition (joint) area or be expanded up to a whole hybrid panel/section/hull construction as needed. In particular, that could be either plane or shaped to satisfy any hull shape requirements, e.g., be streamlined at the outer hull surface.

The material transition structural component is to be used for robust and structurally efficient transition for a primarily metal ship hull structure to a composite structure that is to provide a significant weight saving along with other benefits being required or opposite for a primarily composite ship hull structure to a metal structure that is to satisfy any special requirements to the hull structure, e.g., its extra impact resistance.

The structural component can be used for high-speed surface vessels with a hybrid hull comprising metal and lightweight polymer matrix composite structures. The new material-transition structural component can be used for bow and/or stern sections as well as midship side panels of a primarily metal hull, deck house, bulkheads, foundation structures, waterjet inlet tunnel and/or housing, and a propeller nozzle among others. The material-transition structural component can be also used for submarine outboard applications, such as sonar dome, stabilizer, and/or sail structure, all being mounted on the primarily metal hull.

Aside from shipbuilding, the invention is applicable and potentially beneficial for assorted land/air vehicles, towers and blades of wind turbines, off-shore floating platforms, both wet and dry gap-crossing bridges, among others.

Fastening (locally instead or additionally to the pinning) might be also applied to provide through thickness transverse reinforcement of the multi-material layup.

While the invention has been illustrated and described as embodied in a material-transition structural component for prodcuing ship hulls, ship hulls containing the same, and method of manufacturing the same, it is not intended to be limited to the principle details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A material-transition structural component for a ship hull, comprising: a metal element and a fiber-reinforced polymer matrix composite element adhesively bonded with one another, wherein to enhance interface between said metal and composite elements and provide mechanical engagement in addition to the adhesive bonding therebetween, said metal element is provided with protruded projections and partway intruded cavities at least at one surface facing said composite element; said projections are incorporated into said composite element; and said cavities are filled up with matching prominences being formed on a surface of the composite element facing the protruded/intruded surface of the metal element.

2. A material-transition structural component for a ship hull as defined in claim 1, wherein said cavities are sited radially outward from said projections.

3. A material-transition structural component for a ship hull as defined in claims 1, 2, wherein said projections are formed as upright pins supported by radial side brackets/stiffeners sited between said cavities.

4. A material-transition structural component for a ship hull as defined in claim 1, wherein said elements are provided in a local area of the ship hull.

5. A ship hull, comprising at least a part composed of the material-transition structural component defined in claim 1.

6. A method of manufacturing a material-transition structural component for a ship hull, comprising: the steps of providing a metal element; providing a fiber-reinforced polymer matrix composite element; and providing the adhesive bonding with one another, so as to enhance interface between said metal and composite elements and provide mechanical engagement in addition to the adhesive bonding therebetween, at least one surface of said metal element facing said composite element is provided with protruded projections and partway intruded cavities; said projections are incorporated into said composite element; and said cavities are filled up with matching prominences being formed on a surface of said composite element, facing the protruded/intruded surface of said metal element, concurrently with forming the composite element; consolidation of the composite element with the metal element; and adhesive bonding between said elements.

7. A method of manufacturing a material-transition structural component as defined in claim 6, further comprising: forming the projections as upright pins supported by radial side brackets/stiffeners; and intrusion of the cavities radially to said projections, siting said cavities between said brackets/stiffeners.

8. A method of manufacturing of a material-transition structural component as defined in claim 6, so as to ensure proper saturation of fibrous material of the composite element with polymer resin, further comprising: perforating at least one plate of said metal element, facing said composite element, with through holes; assembly of said metal plate with fibrous material of said composite element; and providing vacuum-assisted infusion of the resin into said fibrous material, simultaneously filling up the perforated holes of said metal element.

9. A method of manufacturing a material-transition structural component as defined in claim 6, further comprising: flattening of the protruded/intruded plate of said metal element prior its assembly with fibrous material of said composite element by applying conventional metal sheet flattening technique being accompanied with use of a medium-hard elastic material being placed against the protruded projections providing thickness of said elastic material exceeding the height of the protruded projections.

10. A method of manufacturing a material-transition structural component as defined in claim 6, further comprising debulking fibrous material of said composite element to the metal element prior forming the composite element applying pressure; tapping; and/or vacuum.

* * * * *